United States Patent [19]

Lewis

[11] 4,026,448

[45] May 31, 1977

[54] BIKE CARRIER SLEEPER

[76] Inventor: Nathanial Henry Lewis, Box 20424, Los Angeles, Calif. 90006

[22] Filed: July 3, 1975

[21] Appl. No.: 593,068

[52] U.S. Cl. .......................... 224/32 A; 280/289 A; 297/184; 297/377; 297/392
[51] Int. Cl.² ........................................ B62J 11/00
[58] Field of Search ............ 224/32 A, 6; 297/184, 297/230, 255, 377, 379, 385, 392; 280/202, 289 R, 289 A, 289 G; 5/118, 119; 135/7

[56] References Cited

UNITED STATES PATENTS

| | | | |
|---|---|---|---|
| 547,102 | 10/1895 | Williams | 280/289 A X |
| 2,864,429 | 12/1958 | Combs | 297/184 |
| 3,162,864 | 12/1964 | Ouellette | 297/385 X |
| 3,285,658 | 11/1966 | Cleveland | 297/392 X |
| 3,409,325 | 11/1968 | Hamilton et al. | 297/377 |
| R26,070 | 8/1966 | Laughlin | 297/377 |

FOREIGN PATENTS OR APPLICATIONS

| | | | |
|---|---|---|---|
| 910,389 | 3/1954 | Germany | 280/202 |
| 592,125 | 9/1947 | United Kingdom | 224/32 A |

*Primary Examiner*—Robert J. Spar
*Assistant Examiner*—Randolph A. Reese

[57] ABSTRACT

A sleeper's elongated back with incorporated top and sides; comprising two rear stabilizing units, thereby securing the attachable invention to a child carrier's backrest. A mountable chin stabilizer and face shield are additions to the invention.

6 Claims, 9 Drawing Figures

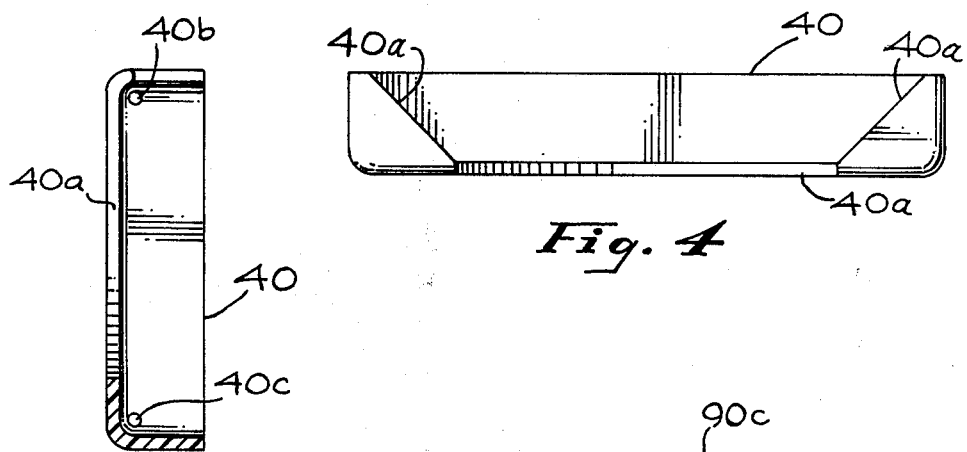
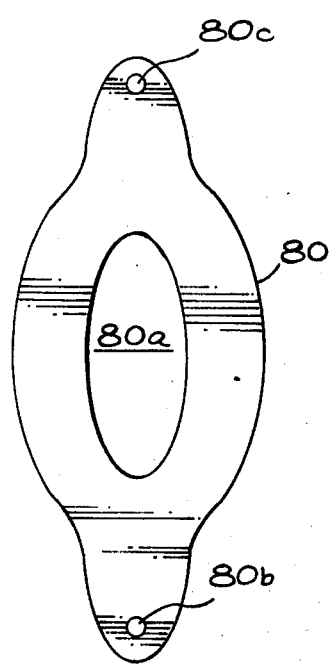
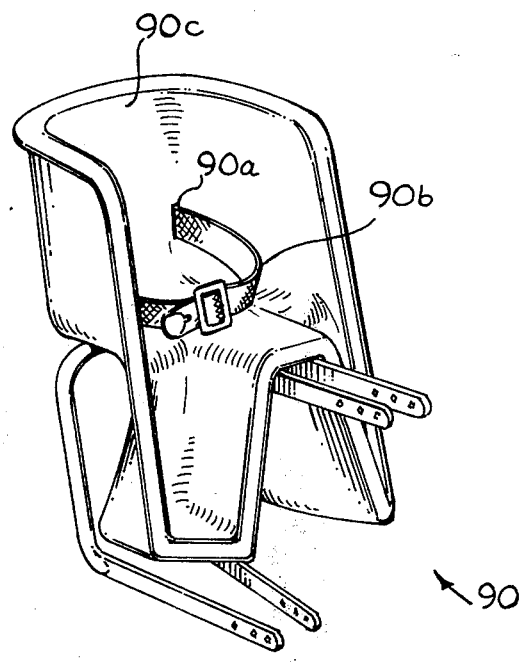
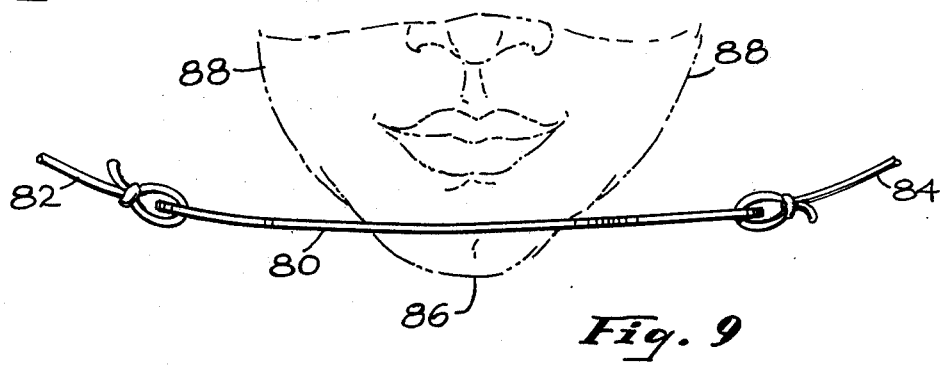

BIKE CARRIER SLEEPER

This bike's carrier's sleeper will be a simple, lightweight, and attachable accessory. This sleeper is engineered and designed to allow a child to rest or sleep comfortably while riding in a child carrier. It can fit all of the various models of child carriers, presently being used by bike riders throughout the world.

I feel that the many bike riders who carry their small children for rides, regularly or occasionally, would appreciate this invention. It was a personal observation that inspired this invention. Many small children who go to sleep in these carriers have no place to rest their heads so the ride becomes very uncomfortable when their heads swing from side to side.

This bike's carrier's sleeper will have simple, but very important features such as a rest for the back, neck, and head. There will be a transparent face shield as well. And this accessory will be easy to mount and dismount, and easy to store when not in use.

Child carriers may be jump seats fastened behind the main seat, or small seats that are attached to the top tube directly behind the handlebar and in front of the main seat. The front seats interfere with the bicyclist's pedaling. The rear seats are more practical and they protect the child from the wind as well. Seat-type carriers include, either as a part of the seat or separately, small stirrups to keep the child's feet out of the spokes; they also have seat belts to keep the child secure in the carrier.

Well-constructed carriers that can be fastened securely to the bicycle are safe. Young children soon learn how to help balance themselves on the bicycle. They enjoy the rides, and though only their parent gets the exercise, both get an outing and see the sights. Though short rides and shopping trips are the most common, some bicycling enthusiasts take small children on long tours.

An extensive analysis of related products and prior patents have shown that this invention has the best compromise of practicality, economy (in all respects), safety, and efficiency. It has novelty all of its own. And it would be very beneficial to the current "bike boom."

The objects and advantages of this invention will be more clearly understood hereinafter from a consideration of the specification with reference to the accompanying drawings forming part thereof, and in which like numerals correspond to like parts throughout the several views of the invention, and wherein:

FIG. 3 is an isolated sectional view of said chin stabilizer, taken on line 3—3 of FIG. 2, and shown without its tie strings;

FIG. 4 is a top view of FIG. 3; but showing entire said tray type chin stabilizer;

FIG. 7 is a perspective view, of an "enclose sides" child carrier;

FIG. 8 is a top view of a chin stabilizer, of the "strap type," and shown without its tie strings, and FIG. 9 is a front view of FIG. 8, shown with its tie strings, and a phantom chin inserted.

Figure 1:
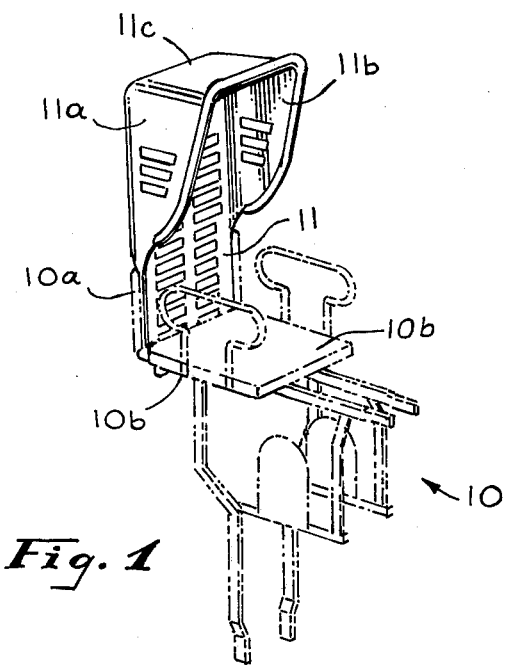
FIG. 1 is a perspective view of the sleeper's elongated back with incorporated top and sides; shown in combination with a phantom child carrier, of the "open sides" type.

Refer to FIG. 1. The bike's carrier's sleeper shown, comprise its main features only. The open sides child carrier 10 supports, the sleeper's elongated back 11 with its backrest 10a and seat 10b.

Figure 2:
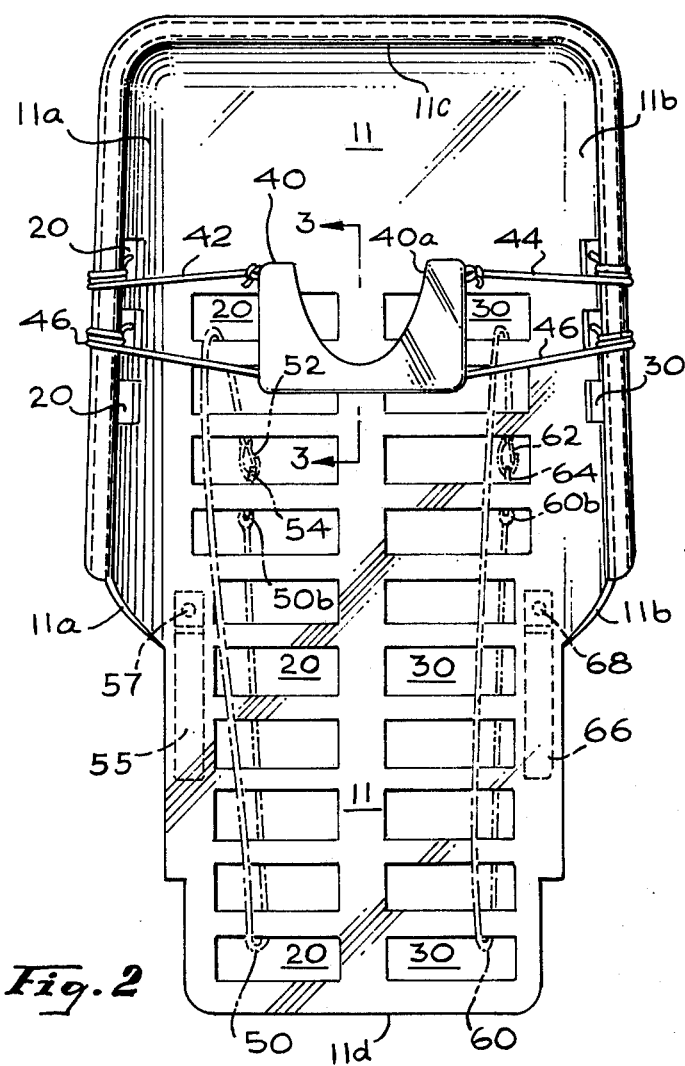
FIG. 2 is an enlarged front view of said elongated back with its incorporated top and sides, isolated from the said child carrier; phantom rear stabilizing lines, two option rear stabilizing clips shown phantom, and a mounted chin stabilizer of the "tray type" are shown.

Refer to FIG. 2. The invention relates to a sleeper for a child carrier of the type having an elongated back 11, opposite sides 11a and 11b extending forwardly from the back 11, and a top 11c connected to the sides 11a and 11b and back 11. This type of sleeper is preferably a one piece structure of molded plastic. The lower portion of the back 11 is alone, of substantial length, and resiliency. Artistic features such as rounded corners and edges are incorporated therein. The sides 11a and 11b and back 11 have a plurality of holes 20 and 30 formed therein. The lower portion of the back 11 has two opposite rectangular indentations of substantial length, which are adjacent to the bottom edge 11d. The two indentations will allow the passage of the belt of said child carrier. The overall length of the back 11 should be at least nineteen inches.

The chin stabilizer 40 of the tray type is shown mounted by way of two upper tie strings or cords 42 and 44 and a lower cord 46, running from one side to the next and through the stabilizer 40. This type of stabilizer 40 is preferably a one piece structure of molded plastic. It is an open rectangular box-shaped structure, the bottom and one elongated side have a centrally located U-shaped groove 40a. The U-shaped groove 40a is contoured so as to conform to the lower part of the face and chin of an average small child. The small holes 40b and 40c shown in FIG. 3 assist in the mounting of the stabilizer 40, a total of four are needed, two at each end. Refer to FIG. 4. The U-shaped groove 40a can be padded; the use of a home made padding will be much simpler and more effective. The stabilizer 40 will be a very important auxiliary feature; a child's head should be well secured, while sleeping.

Another very important auxiliary feature is the two rear stabilizing lines 50 and 60 shown with one fastening method. The left-hand line 50 comprises two eyelets; one eyelet 50b is shown, with two hooks 52 and 54 hooked together. The right-hand line 60 comprises two eyelets; one eyelet 60b is shown, with two hooks 62 and 64 hooked together. An ALTERNATIVE FASTENING METHOD is to eliminate the said eyelets and hooks; then, fasten the ends of the lines 50 and 60 by tying "BOWKNOTS," a very simple and efficient method. The stabilizing lines 50 and 60, including a fastening method, would secure the elongated tank 11 of said sleeper, to the backrest of a child carrier.

A pad can be engineered and designed to fit inside of said sleeper, and against its elongated tank 11. However, a baby blanket will service just as well. And it would make a more economical, versatile, and softer resting pad for the buttocks, back, neck, and head.

Figure 5:
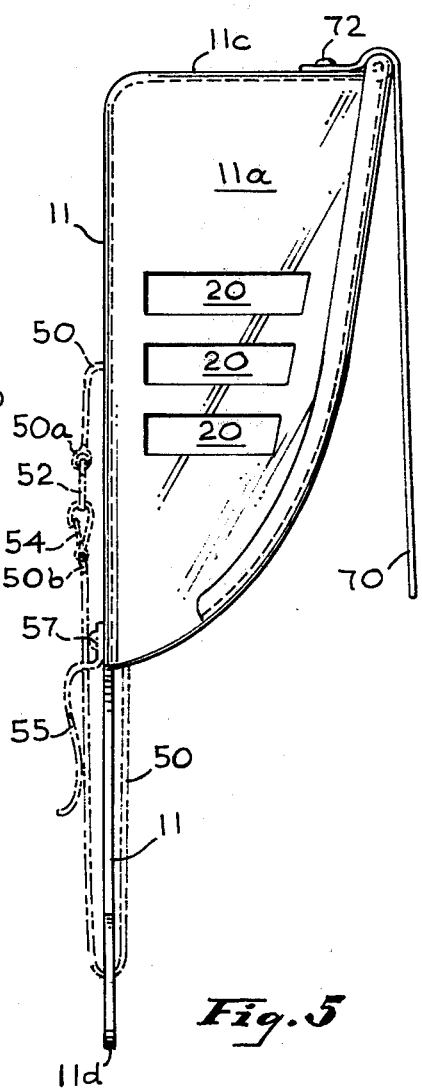
FIG. 5 is a side view of FIG. 2; said chin stabilizer has been removed, and a face shield added.

Refer to FIG. 5. The left-hand line 50 with its two eyelets 50a and 50b and two fasten hooks 52 and 54 are shown. An ALTERNATIVE MOUNTING METHOD would be to use two rear clips, instead of said lines. One clip 55 is shown with its rivet 57. See FIG. 2 for the second clip 66 and its rivet location. Note the face shield 70 in FIG. 5, another auxiliary feature; this one is option.

Figure 6:
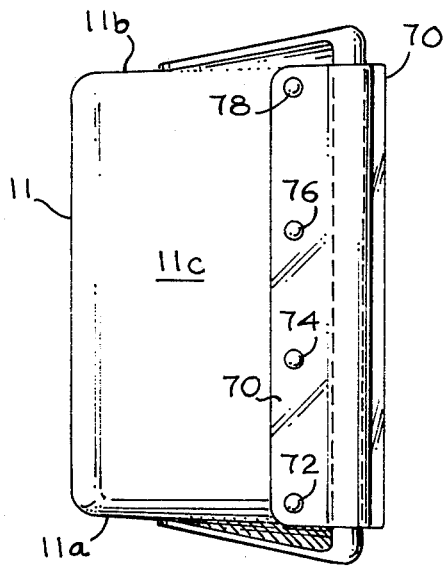
FIG. 6 is a top view of FIG. 5; said phantom rear lines and clips have been removed.

Refer to FIG. 6. The rectangular face shield 70 is made from a flexible, transparent, and porous material. One end of the elongated shield 70 is fastened to the top 11c of said sleeper, with four equally spaced rivets 72, 74, 76, and 78. It will be used to protect the face of a sleeping child. The free end hanging vertically, can be thrown back over the top 11c of said sleeper, when shield 70 is not in use.

Refer to FIG. 7. The enclose sides carrier 90 is one of the more popular versions. The said sleeper is mounted by running the right rear stabilizing line 60, through the right hole 90a, through which the belt 90b passes. The left rear stabilizing line 50 will pass through the left belt hole, not shown. The elongated back 11 of the said carrier's sleeper will rest against the backrest 90c of the carrier 90. Review the lines 50 and 60 and the elongated back 11 in FIG. 2.

Refer to FIG. 8. The strap type chin stabilizer 80 is an elongated oval-shaped band with a centrally located chin hole 80a and reinforced string holes 80b and 80c. FIG. 9 shows the stabilizer 80 with an inserted chin 86 and tie strings or cords 82 and 84 for mounting purpose. One side of the stabilizer 80 can have a soft felt covering, for the chin 86 and cheeks 88 comfort.

Prototypes were built and tested. Refer to FIGS. 2 and 5, for the fastening of the clips 55 and 66 and the face shield 70, respectively; one can use screws, bolts, rivets adhesives. A child will be ready for a more comfortable ride when awake or when asleep with said sleeper. The said bike's carrier's sleeper would prevent neck whiplash, whenever the bike starts or stops. And it would act as a sun shelter, as well.

The said carrier's sleeper can also act as a shelter while carrying a child on a windy, or snowy, or rainy day if the need ever arises, when riding a child in such weather becomes necessary. A bag of groceries can be carried in a child carrier more safely, with the aid of said sleeper. The above uses are bonuses.

It was the intent of this invention to invent a simple, but practical and efficient invention. Therefore, much time and effort went into the engineering, designing, and testing of this invention.

The following is claimed:

1. A sleeper, attachable to a child carrier of a bicycle and adapted to carry a child too small to sit without support, comprising a structure having an elongated back, two sides extending forwardly from said back, and a top connected to said sides and back, the upper portion of said back integrally formed with said sides and top, the lower portion of said back engaging a seat portion of the child carrier and attached thereto by mounting means which secure the sleeper on the child carrier, said sleeper also including means to stabilize the head of a child.

2. The sleeper as claimed in claim 1, wherein said sides and said back having a plurality of holes formed therein, said holes adapted to assist the means for mounting said sleeper to said child carrier 3. The sleeper as claimed in claim 2, wherein said stabilizing means includes an improved chin support of the type having an elongated oval-shaped band, means for mounting said chin support located on opposite ends of said band, wherein the improvement comprises a hole centrally positioned in said band, said hole adapted to stabilize a chin resting therein when said chin support is mounted on said sleeper.

4. The sleeper as claimed in claim 2, wherein said stabilizing means includes a chin support for said sleeper which comprises an open rectangular box-shaped structure consisting of a bottom, upper and lower elongated sides, and two end portions, said bottom of said structure being vertically oriented, said bottom and upper elongated side having a U-shaped groove centrally located therein, a substantial portion of said bottom located between the lowest portion of said U-shaped groove and the lower elongated side so as to provide the structure with substantial rigidity, said two end portions incorporating means for mounting said chin support, said U-shaped groove adapted to stabilize a chin resting therein when said chin support is mounted on said sleeper.

5. The sleeper as claimed in claim 1, wherein said lower portion of said back having opposite rectangular indentations of substantial length, perpendicular to and adjacent the bottom edge of said lower portion, whereby said indentations allow the passage of a belt of said child carrier.

6. The sleeper as claimed in claim 1, including a rectangular flexible face shield, the upper end of said shield being fastened to the forward portion of said top, the lower end of said shield a substantial distance from said upper end being free of attachments, thereby allowing said vertically oriented shield to hand forward of said sleeper.

* * * * *